May 20, 1952 J. J. KOENIG ET AL 2,597,006
WATER-INSOLUBLE ADHESIVE COMPOSITION
Filed Aug. 13, 1948
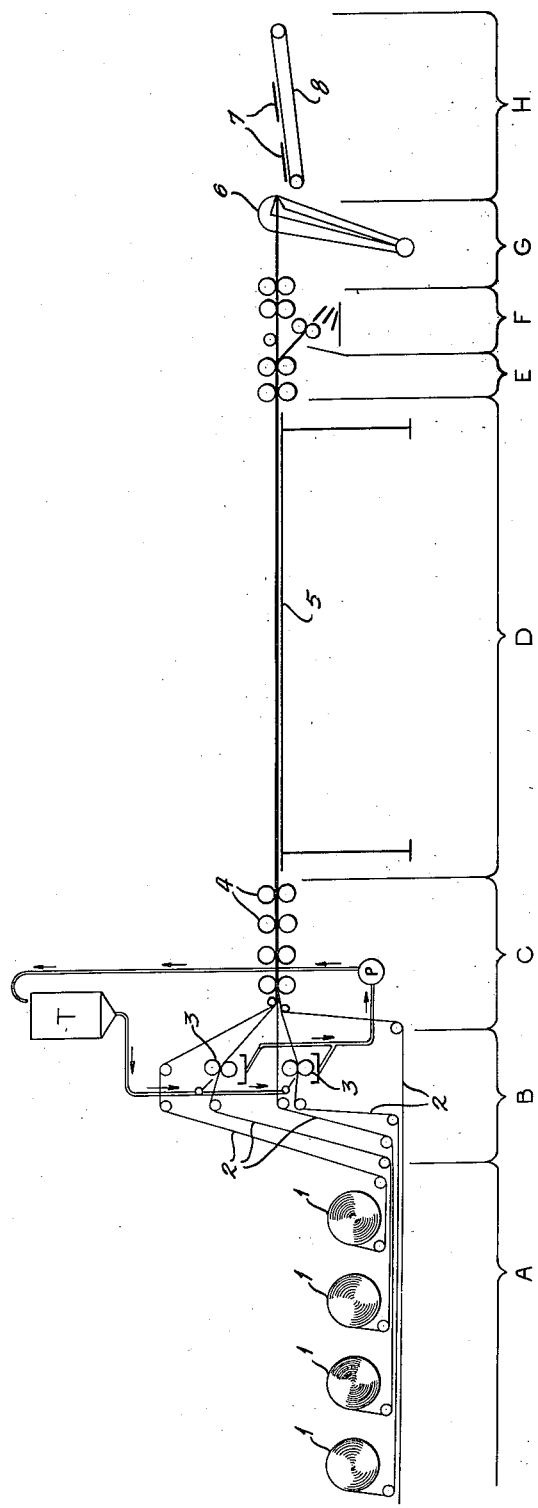
INVENTORS
Joseph J. Koenig,
Frank G. Erskine and
Albert R. McManus,
by Carrigan Prouty
Their ATTORNEYS Patented May 20, 1952

2,597,006

UNITED STATES PATENT OFFICE 2,597,006

WATER-INSOLUBLE ADHESIVE COMPOSITION

Joseph J. Koenig, St. Louis, Frank G. Erskine, Kirkwood, and Albert R. McManus, St. Louis, Mo., assignors to Gaylord Container Corporation, St. Louis, Mo., a corporation of Maryland Application August 13, 1948, Serial No. 44,164

6 Claims. (Cl. 106—154)

This invention relates to the preparation of water insoluble adhesives possessing specific properties adapted for use in the paperboard industry, particularly in the manufacture of laminated paperboard usually known as solid fibre board, and specifically of the types which meet requirements of resistance to delamination upon submersion in water under conditions of the test imposed by the joint Army and Navy Specification, JAN–P–108 for "V" boxes.

Solid fibre board is a laminated product used in the manufacture of shipping containers. It usually consists of two kraft liners with one or more filler sheets bonded with an adhesive to form a solid board by a continuous automatic operation. This is accomplished by a conventional machine known as a paster, diagrammatically illustrated in the accompanying drawing. This machine comprises roll stands (section A) accommodating two to four or more rolls 1, from which plies 2 of paperboard are fed to the gluing operation, a set of glue application rolls 3 (section B) by means of which the adhesive is applied to one face or both faces of each sheet 2, a series of press rolls 4 (section C) for consolidating the several plies and calendering the web, a dryer (section D) which may comprise a festoon arrangement or a table 5 over which the web passes to the slitter (section E) to scrap collector F, thence to the cutter 6 (section G), and finally to a take-off (section H), where the laminated sheets 7 are stacked on a conveyor 8 for transfer to the subsequent operations.

The several plies 2 of paperboard are fed continuously through the machine usually at a rate of from 250 to 300 feet or more per minute. The length of the machine is such that the travel of the board from the application rolls 3 to the cutter knives (section G) is ordinarily accomplished in the order of 30 seconds or less.

Adhesives for solid fibre manufacture must meet several critical chemical and physical requirements imposed by the above described typical continuous laminating operation:

(1) The initial or wet tackiness of the adhesive must be sufficient to effect a bonding of the plies in the few seconds during which the sheets travel from the application rolls (section B) through the press rolls (section C).

(2) During the travel from the press rolls (section C) to the slitter and cutter (sections F and G) sufficient jelling of the adhesive must take place to effect a bond which will withstand the severe strain imposed by these shearing operations without lateral or end ply separation of the trimmed laminated sheets. Trimmed sheets showing either lateral or end separation must be discarded as of only scrap or waste paper value. For practical purposes, the rejections at the take-off (section H) must not exceed the normal or established scrap tolerances for unavoidable loss, otherwise the use of the adhesive becomes prohibitive in overall cost.

(3) It must be capable of forming a continuous film of uniform thickness, preferably between 30 and 60 microns.

(4) It must flow freely from the catch pans under the application rolls to the pumps for recirculation through the storage tanks (section T) thence back to the application rolls (section B).

(5) The aqueous content of the adhesive must be as low as possible, preferably not exceeding 60% to 65% by weight, since a higher content results in a relatively wet laminated board. Such board is soft and tends to warp, which, in turn, is productive of operating difficulties and excessive scrap material in the subsequent scoring and printing operations.

(6) The adhesive must be capable of performing satisfactorily with respect to uniform spreading and speed of gelling under the considerable variations in thickness of glue line imposed by the usual variation in the finish or sizing of the paperboard employed in the manufacture of solid fibre board. For example, the stock may vary from unsized, absorptive material to highly sized less absorptive board. The former will obviously require a heavier glue line than the latter, yet for economical operation, the laminating machine must be operated at or near its maximum speed on all types of board. A heavier glue line connotes more aqueous solvent per unit area to be eliminated in unit time to promote gelation, or setting. Thus the properties of the adhesive must be such that it will form initial and final bonds within the time limits imposed by the conventional laminating operation under considerable variations in the glue line thickness.

(7) The final bond produced by the adhesive must withstand the water immersion test described by the Army and Navy Specification JAN–P–108 for "V" boxes without any ply separation.

(8) To insure overall economy in fabrication of solid fibre board, the scrap or waste laminated board at the take-off (section H), (exclusive of the unavoidable roll splicing and trim losses) should be as near "zero" as possible. Since the value of a typical 4-ply board at this point may be more than 10 times the cost of the adhesive employed in bonding the plies, an increase of even 1% in scrap attributable to imperfect bonding may easily disqualify a high mileage, low cost adhesive because of the heavy scrap expense and resulting production loss.

The adhesives in common use in the fibre board industry do not produce water insoluble bonds capable of meeting Specification JAN-P-108, with the consequence that containers made from such fibre board are not adapted for use under wet conditions.

The composition of our invention meets all of the above critical chemical and physical requirements encountered in solid fibre manufacture, with substantially zero scrap loss. Furthermore, it has a high mileage of one gallon or less per M sq. ft. of glue line combined with a low cost per gallon. In addition, the solid fibre board produced therefrom is of a very low moisture content (averaging 10% to 15%) depending on components used, and shows no ply separation whatsoever under the water-resistance test established by the Army and Navy for "V" boxes. This test provides for the immersion of a sample of the laminated board in water at 75° F. for 24 hours whereupon a ply separation not exceeding ¼" is permissible. Even after immersion under these conditions for more than four days, the product of our invention showed no delamination of the plies. Furthermore, paperboard consolidated by means of the product of our invention exhibits no ply separation after treatment in boiling water for ten or more hours.

Thus the composition of our invention is the result of a carefully balanced formula which meets all of the colloidal, chemical and physical requirements imposed by the typical laminating equipment, yields a water insoluble bond, and combines high mileage, low cost per gallon and negligible scrap losses to give an overall economy not heretofore attained by a water insoluble composition suitable for fibreboard manufacture.

In carrying out our invention, we employ a system consisting of proteinacious material, such as soybean protein or other vegetable proteins, clays or other minerals in a finely divided state, completely dispersed in an aqueous alkaline medium of controlled hydrogen ion concentration, said composition having a viscosity in the range of 14,000 centipoises to 20,000 centipoises measured by the Brookfield viscometer method.

An important feature of our invention is the discovery that the essential characteristics of protein adhesive systems for use in the manufacture of solid fibre paperboard, such as uniform spreading properties, high initial adhesiveness, or tackiness of very thin glue line in the liquid phase, rapidity of drying, etc., are all enhanced to a surprising degree by reducing the solid components of the system to extremely fine particle size. For example, the unique results of our invention are attained when the particle size of each of the components of the adhesive composition are reduced by mechanical or chemical means to particles that will pass a U. S. sieve #325 opening, corresponding to about 44 microns. Even superior results are obtained when the particle size is reduced to 10 microns or colloidal dimensions.

It is believed that these extraordinary results are due primarily to the more complete dispersion of the solids and the more accurate control of the action of the dispersing agent made possible when said agent is applied to the vastly increased surface area of particles resulting from a prior mechanical reduction thereof to extremely fine or colloidal dimensions. Under the conditions described, the ratio of actual alkali to protein can be held to just the amount necessary to effect complete dispersion with a minimum of depolymerization, whereas with the particle size usually employed, for example, the size that will be held on a 100 mesh screen, an excess of alkali may be required to effect even an incomplete dispersion. The presence of such excess alkali tends to excessively depolymerize the protein molecular structure with resulting loss of adhesiveness and uniformity of film made therefrom.

Since it is frequently necessary in practice to store substantial quantities of adhesives for several days, it is important from a practical standpoint that protein compositions remain stable and of unimpaired quality over such storage periods. As a result of extensive experimentation, we have found that the stability of such compositions appear to depend upon three factors:

First, the type of alkali employed as a dispersing agent.

Second, the use of an inhibitor of fungi or other micro-organism action.

Third, maintaining the temperature of the protein composition during its preparation, storage, and use at as near room temperature as possible.

We have found that the use of potassium hydroxide results in a greatly improved storage life and in addition imparts to such compositions better spreading and freer flowing properties than dispersions made under identical conditions with equivalent amounts of other alkalies. Apparently the protein-potassium complex formed is more resistant to hydrolysis or other forms of degradation than are the complexes formed with other alkalies, such as sodium hydroxide, ammonium hydroxide, and the like.

Protein compositions are susceptible to deterioration by fungi or other micro-organisms, consequently it is advisable to maintain sterile conditions in the adhesive system as far as possible and to add a preservative such as sodium pentachlorophenate or other inhibitors.

The rate of hydrolysis or decomposition of protein dispersions increases rapidly with elevated temperatures, for example, rate of decomposition may be doubled with every ten degrees Fahrenheit increase in temperature above 100 degrees. It is, therefore, desirable to maintain the temperature of such dispersions during preparation, use and storage as low as practicable and preferably not exceeding 100° F.

By a proper balance of these three factors, namely; the use of potassium hydroxide as a dispersing agent, the use of an effective inhibitor of degradation by any types of micro-organisms, and the control of the temperature of the protein composition at all times to not exceeding 100° F., the composition may be stored for several days with unimpaired properties. This valuable prolonged working life compares with only a few hours stability attained with the use, for example, of sodium hydroxide as a dispersing agent even though the same preservative is employed and the temperatures controlled in the same manner as with the use of potassium hydroxide.

The ratio of potassium hydroxide to protein employed in our invention is controlled between 7.9% and 8.1%. This ratio will give a hydrogen-ion concentration of the finished composition pH 10.5 to 10.7. We have found that the maximum adhesiveness of this protein composition is attained in the pH range of about 10.5 to 10.7. With lower ratios of alkali to protein than described above, the pH of the final composition will be less than 10.4 and the composition will be deficient in adhesiveness. Ratios of alkali to protein higher than the limits described give a pH of the final composition in excess of about 10.8, which is somewhat beyond the range of maximum effectiveness. Beyond the range of pH 11.0 the adhesiveness of a composition falls off rather rapidly.

Whatever the explanation may be, we have discovered that the control of the particle size of the components to that which will pass a U. S. sieve #325, or about 44 microns, a ratio of potassium hydroxide of 7.9% to 8.1% of the protein and the control of temperature throughout preparation and use, preferably to not exceeding 100° F., are essential features in the formulation of the adhesive composition of our invention.

While coarser particle sizes may be used, they limit the adhesiveness and spreading qualities of the finished adhesive with resulting increased cost per M sq. ft. of coverage. Alkalies other than potassium hydroxide may be used but the useful life of the composition will be sharply reduced and the spreading qualities impaired so that the amount of adhesive per M sq. ft. of coverage required to effect a satisfactory bond will be increased.

For the protein component, we prefer a soybean isolated protein, such as the quality known in commerce as "Alpha Protein" having the following specifications:

Actual protein content, average approximately _____ per cent__ 88.7
Moisture content, average approximately
                                    per cent__ 8.5
Viscosity range _____ C. P. S__ 350 to 500

Other isolated soya proteins such as "Ortho Protein" may be used to equally good advantage. This commercial grade has the following specifications:

Actual protein content, average approximately _____ per cent__ 83.0
Moisture content, average approximately
                                    per cent__ 7-11.0
Viscosity range_____C. P. S__ 350 to 500

We may also use soya protein meal and combinations of isolated protein and soya meal. A satisfactory grade of soya meal is marketed under the trade name of "Procein," which has the following specifications:

| | Per cent |
|---|---|
| Protein content, approximately | 53.5 |
| Moisture content, approximately | 4.8 |
| Fibre | 2.3 |
| Fat | 0.9 |
| Ash | 5.9 |
| Nitrogen free extract | 32.6 |
| | 100.0 |

The nitrogen free extract in the above analysis represents natural sugars, other carbohydrates, pigments, etc. Both the isolated proteins and the meal grade contain very minor percentages of salts of potassium, sodium, calcium, magnesium, phosphorus, sulphur and chlorine. The grades, however, which contain the highest percentage of actual protein are preferred, since they impart the desirable characteristics to the adhesive composition to the greatest extent.

For the clay components, we use clays, known in the trade as "soft," of the hydrous aluminum silicate type, preferably the commercial brands known as "Klondike" or "DRG" clay and Kalox, or other minerals which have similar properties such as, for example, barium sulphate. These clays and other minerals are hereinafter referred to as "clays." Such clays in the presence of potassium hydroxide appear to break down to colloidal dimensions, which contributes to the desired homogeneity of the finished adhesive composition.

Uniformity of quality, particularly the hydrophilic properties of the clay is important, since the amount of chemically bound water and the amount which the clay absorbs has a profound effect on the fluidity and other properties of the finished composition.

We have found that the brand known as "Klondike" or "DRG" clay is satisfactory. This clay has the following analysis:

| | |
|---|---|
| Moisture at 100° C | .30 |
| Ignition loss | 13.65 |
| $SiO_2$ | 42.01 |
| $Al_2O_3$ | 41.48 |
| $Fe_2O_3$ | .03 |
| CaO | .60 |
| MgO | .47 |
| Alkalies | .47 |
| $TiO_2$ | .99 |
| | 100.00 |

Another satisfactory example is a commercial brand known as "Kaolex" of which the following is a typical specification:

| | |
|---|---|
| $H_2O$ combined | 13.71 |
| $SiO_2$ | 45.28 |
| $Al_2O_3$ | 37.15 |
| $Fe_2O_3$ | .84 |
| $TiO_2$ | .75 |
| $Na_2O$ | .45 |
| $K_2O$ | 1.57 |

An important feature of our invention is the low cost of the ingredients employed. Furthermore, the covering power of the adhesive is high, being of the order of one gallon or less per M sq. ft. of glue line, consequently the adhesive cost per M sq. ft. of 4-play fibreboard, for example, is far lower than for the ordinary water insoluble adhesives available to, and used in the industry.

Following is an example of the preferred practice in carrying out our invention:

Step 1.—Six-hundred and sixty-five (665) gallons of water are run into a mixing tank equipped with efficient agitation and means for temperature control. The water is brought to a temperature preferably of about 80° F. While the temperature of the water may be varied within reasonable limits, for example, between 70° F. and not exceeding 100° F., cooler water tends to delay the dispersion of the proteins, and water of higher temperatures accelerates hydrolysis of the protein component and should be avoided.

Step 2.—Agitation is maintained throughout the preparation of the adhesive composition, since, as ingredients are added, a thixotropic suspension is formed, which requires continued agitation to maintain uniform consistency.

Step 3.—One gallon of steam distilled pine oil is added, which acts as wetting agent for the dry ingredients subsequently added and reduces the viscosity of the finished adhesive, thereby enhancing its spreading and flowing characteristics.

Step 4.—Eighteen-hundred pounds (1800 lbs.) of Klondike DRG clay are added.

Step 5.—After the clay has been thoroughly mixed with the water, 42 pounds of sodium pentachlorophenate dissolved in 15 gallons of water are added. This material is a fungicide and preservative for protein and carbohydrates and is added at this stage because, being strongly alkaline, it aids in the dispersion of the clay particles and thickens the dispersion slightly. It is also an aid, due to its alkalinity, in peptizing the subsequently added protein.

Step 6.—Add 1600 pounds of soya Alpha Protein, preferably of a viscosity of 350 to 500 centipoises.

Step 7.—After the addition of the Alpha Protein, agitation should be maintained for 15 minutes to insure thorough wetting and dispersion of the protein particles.

Step 8.—One hundred and twenty-eight pounds (128 lbs.) of potassium hydroxide, dissolved in 50 gallons of water, are added as rapidly as possible upon the completion of the mixing of the protein and clay. The mixture will be observed to thicken immediately after the addition of the potassium hydroxide and continues to thicken until peptization is complete. During this step in the process, the protein particles swell into translucent globules and finally rupture. The clay particles likewise apparently break down and form colloidal combinations with the protein and potassium hydroxide, since no clay particles can be discovered when a thin film of the finished composition is examined under a microscope at 100 diameters' magnification.

Distinct advantages result from the addition of the clay in advance of the proteins. This practice insures a maximum dispersion of the clay and avoids any tendency to form lumps, such as occur when the clay is added simultaneously with the protein or subsequent to the protein. In addition, it is believed that the clay particles act as an aid to the complete dispersion of the protein by a grinding action on the surface of the protein particles, thus exposing more and more protein surface to the action of the subsequently added alkali solution.

Step 9.—Peptization of the protein is completed in thirty minutes after the addition of the alkali solution. A sufficient amount of water is then added to bring the volume to exactly 1056 gallons during continuous agitation. The temperature throughout the preparation of the mixture is controlled to between 70° and 100° F. Upon completion of the batch, the temperature is adjusted to between 90° and 100° F., and is then ready for use. Because of the thixotropic nature of the adhesive, it should be maintained in motion at all times, including storage, by mild agitation.

The main peptizing agent, potassium hydroxide, may be replaced wholly or in part by other alkali, if desired. Potassium hydroxide (KOH) is preferred because of the greatly increased stability or storage life imparted to the adhesive composition than results with the use of other alkalies. In addition, the spreading property, or mileage obtained with the adhesive in terms of volume per M sq. ft. of glue line is substantially greater than with the use of other alkalies. Ammonium hydroxide (NH4OH) produces an adhesive composition of somewhat higher viscosity, while sodium hydroxide (NaOH) results in a solution viscosity intermediate between that produced with potassium hydroxide and ammonium hydroxide.

Other variations of the preferred practice may be made if desired; for example, soy flour may be used for all or part of the Alpha Protein content. Preservatives other than sodium pentachlorophenate may be employed.

It is to be understood that the particular product shown and described and the particular procedure set forth, are presented for purposes of explanation and illustration, and that various modifications of both product and procedure can be made without departing from the scope of our invention as described in the appended claims.

Viscosity measurements referred to herein are made by the following methods:

*For determining viscosity of isolated proteins*

PROCEDURE

1. In a glass or porcelain vessel 2¾" dia. and 4" or more in depth put 220 gms. of water at 70° F.
2. Add with some agitation 54 gms. protein.
3. Allow to agitate slowly for fifteen minutes.
4. After item 3 has slurried for fifteen minutes, add 4.32 gms. of potassium hydroxide that has been dissolved in 26 gms. water.
5. Allow 4 to mix slowly (to avoid air bubbles) for 10 minutes, raising the temperature to 80° F.
6. When 4 has mixed for 10 minutes check the viscosity by transferring the vessel under a Brookfield viscometer equipped with a #2 spindle. Spindle speed should be 30 R. P. M.
7. Make necessary adjustments to reading shown on viscometer to obtain viscosity in centipoises and report same as being obtained at 80° F.

FORMULA OF ABOVE SOLUTION

| | Per cent |
|---|---|
| Water | 82 |
| Protein | 18 |
| | 100 |

Add to the above mixture 8% of potassium hydroxide based on weight of protein.

*For determining viscosity of finished adhesive composition*

Sample of adhesive compounded as described in the example is agitated thoroughly at 100° F., for 10 minutes, care being taken to keep the adhesive free of air bubbles. Test is made with a Brookfield viscometer using a #4 spindle at 30 R. P. M., while maintaining the composition at 100° F.

What we claim is:

1. The process of compounding a homogeneous, aqueous, fast setting, stable, smooth spreading, laminating adhesive composition for rapidly, effectively and permanently bonding and laminating two or more fibrous sheets of paperboard together comprising the successive steps of metering about 665 gallons of water into a mixing tank, adjusting the temperature of the water to between about 85° and 90° F., introducing about 1800 pounds of clay into the water and agitating the mass until a smooth clay slip free of lumps is formed, continuing the agitation and adding about 1600 pounds of isolated protein, maintaining agitation for about 15 minutes to thoroughly wet and disperse the protein particles, immediately thereupon rapidly adding approximately 128 pounds of potassium hydroxide dissolved in about 50 gallons of water to said mixture and continuing the agitation, the resultant composition having a pH of about 10.5 to 10.7, the temperature of the composition being held throughout the compounding and until consumed within the range of about 85° to 100° F., all solid components of the adhesive being of a size less than 45 microns.

2. The process set forth in claim 1 wherein about 42 pounds of sodium pentachlorophenate are dissolved in about 15 gallons of water and are added after the clay is added but before the protein is added.

3. The process set forth in claim 1 wherein approximately one gallon of pine oil is added to the 665 gallons of water and dispersed therein prior to the addition of the clay component of the composition.

4. A homogeneous, aqueous, fast setting, stable, smooth spreading, laminating adhesive composition for rapidly, effectively and permanently bonding and laminating two or more fibrous sheets of paperboard together comprising the following admixed ingredients: about 665 gallons of water, the temperature of which water is between 85° and 90° F., about 1800 pounds of clay, about 1600 pounds of isolated protein, approximately 128 pounds of potassium hydroxide in about 50 gallons of water, the resultant composition having a pH of about 10.5 to 10.7, the temperature of the composition being held, until consumed, within the range of about 85° to 100° F., and all solid components of the adhesive being of a size less than 45 microns.

5. The adhesive composition set forth in claim 4 wherein about 42 pounds of sodium pentachlorophenate dissolved in about 15 gallons of water is included.

6. The adhesive composition set forth in claim 4, wherein approximately one gallon of pine oil is included in the 665 gallons of water.

JOSEPH J. KOENIG.
FRANK G. ERSKINE.
ALBERT R. McMANUS.

REFERENCES CITED

The following references are of record in the file of this patent:

UNITED STATES PATENTS

| Number | Name | Date |
|---|---|---|
| 2,271,620 | Brier | Feb. 3, 1920 |

OTHER REFERENCES

Industrial and Engineering Chem., July 1942, pp. 817-820; Smith et al., article on Soybean Protein.

Sutermeister: Casein and Its Industrial Application, 2nd ed., 1939, p. 308.